United States Patent
Endo et al.

(10) Patent No.: US 7,397,481 B2
(45) Date of Patent: Jul. 8, 2008

(54) IMAGE DISPLAY METHOD AND IMAGE DISPLAY SYSTEM

(75) Inventors: Takaaki Endo, Chiba (JP); Masakazu Fujiki, Kanagawa (JP); Tsuyoshi Kuroki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 234 days.

(21) Appl. No.: 10/953,935

(22) Filed: Sep. 29, 2004

(65) Prior Publication Data

US 2005/0068316 A1 Mar. 31, 2005

(30) Foreign Application Priority Data

Sep. 30, 2003 (JP) ............... 2003-341627

(51) Int. Cl.
*G09G 5/00* (2006.01)

(52) U.S. Cl. .............. 345/632; 345/633; 345/419; 345/629

(58) Field of Classification Search ........... 345/632, 345/633
See application file for complete search history.

(56) References Cited

U.S. PATENT DOCUMENTS

| | | | |
|---|---|---|---|
| 5,423,554 A * | 6/1995 | Davis | 463/4 |
| 6,236,412 B1 * | 5/2001 | Ojima | 345/474 |
| 6,522,312 B2 | 2/2003 | Ohshima | |
| 7,053,915 B1 * | 5/2006 | Jung et al. | 345/633 |
| 7,312,795 B2 * | 12/2007 | Aso et al. | 345/419 |
| 2002/0060648 A1 * | 5/2002 | Matsui et al. | 345/8 |
| 2002/0084974 A1 | 7/2002 | Ohshima | |
| 2005/0073531 A1 * | 4/2005 | Kuroki et al. | 345/633 |

FOREIGN PATENT DOCUMENTS

| EP | 0899690 A2 | 3/1999 |
|---|---|---|
| EP | 899690 A2 * | 3/1999 |

OTHER PUBLICATIONS

T. Okuma, et al, "An Augmented Reality System Using a Real-time Vision Based Registration", IEEE Comput. Soc, US, Aug. 16, 1998, pp. 1226-1229.
H. Kato, et al, "Virtual Object Manipulation on a Table-Top AR Enviornment", IEEE US, Oct. 5, 2000, pp. 111-119.
Okuma, et al., "An Augmented Reality System Using a Real-time Vision Based Registration", IEEE Comput. Soc., 1998, pp. 1226-1229, US.

* cited by examiner

*Primary Examiner*—Kee M. Tung
*Assistant Examiner*—Jwalant Amin
(74) *Attorney, Agent, or Firm*—Canon U.S.A. Inc., I.P. Division

(57) ABSTRACT

Real space image including a simple prototype created based on three-dimensional CAD data is captured by an image input apparatus. A position/orientation measuring apparatus measures positions and orientations of the image input apparatus and simple prototype. An information processor captures position/orientation information representing the position and orientation of the simple prototype in the image captured by the image input apparatus 102. The information processor further extracts a hand area from an image, renders a three-dimensional computer graphic image on the simple prototype, excluding the extracted hand area, in the image based on the position/orientation information and the three-dimensional CAD data, and synthesizes the image and the three-dimensional computer graphic image. Here, the simple prototype has a different color from a color of the hand area.

11 Claims, 14 Drawing Sheets

IMAGE DISPLAY METHOD AND IMAGE DISPLAY SYSTEM

This application claims priority from Japanese Patent Application No. 2003-341627 filed on Sep. 30, 2003, which is hereby incorporated by reference herein.

BACKGROUND OF THE INVENTION

1. Field of the Invention

The present invention relates to an image display system and image display method for providing an observer with virtual space image information over real space image information at a given viewpoint.

2. Description of the Related Art

Hitherto, a mixed reality system provides a user with a synthesized image by merging a real space image and a virtual space image created in accordance with a user's viewpoint and a user's viewing direction. A mixed reality system disclosed in Japanese Patent Laid-Open No. 11-136706 can provide an observer with a feeling that a virtual object actually exists in a real space such that the user can perform more real observation with a sense of actual size than a conventional virtual reality system (VR system).

On the other hand, designing forms and creating designs using a three-dimensional CAD (which will be called 3D-CAD) are going mainstream so far in design/manufacturing fields. The predominant methods for evaluating an object designed by a 3D-CAD includes a method for visually evaluating data (solid data) created by a 3D-CAD, which is displayed on a screen of a computer as three-dimensional computer graphics (called 3D-CD, hereinafter) and a method for creating a simple prototype (simple mock-up) by using a rapid prototyping apparatus for visual and tactile evaluation.

However, the method in which 3D-CAD data is displayed as 3D-CG on a screen of a computer can provide evaluation in a virtual space but cannot provide evaluation of an object in a real space with a sense of actual size. The method in which a simple prototype (simple mock-up) is created by using a rapid prototyping apparatus is effective for recognizing a rough form but does not reconstruct detail information, such as design and/or form details and colors, designed under 3D-CAD, due to limitations in processing accuracy, material and so on. Therefore, a method for evaluating design data in a more finished form has been demanded.

SUMMARY OF THE INVENTION

The present invention was made in view of the problem. Accordingly, it is an object of the present invention to allow evaluation of a design in a more finished form by using a simple prototype.

In order to achieve the object, one aspect of the invention includes:

an inputting step for inputting a real space image captured by an image-taking device, real space image information including a mock-up created based on three-dimensional CAD data;

a measuring step for measuring positions and orientations of the image-taking device and mock-up and capturing position/orientation information representing the position and orientation of the mock-up in the shot image;

an area extracting step for extracting an area including a predetermined color from the shot image; and a synthesizing step for rendering a three-dimensional computer graphic image on the mock-up, without the area extracted by the area extracting step, in the real space image based on the position/orientation information and the three-dimensional CAD data and merging the shot image and the three-dimensional computer graphic image. Here, the mock-up has a different color from a color of the area to be extracted by the area extracting step.

Another aspect of the invention includes:

an inputting step for inputting a real space image captured by an image-taking device, real space image information including a mock-up created based on three-dimensional CAD data;

a feature-point extracting step for extracting a marker from the shot image, the marker being at a known three-dimensional position on the mock-up;

a measuring step for measuring positions and orientations of the image-taking device and mock-up, obtaining position/orientation information representing the position and orientation of the mock-up in the real space image, and correcting the position/orientation information based on a position of the marker extracted by the feature-point extracting step; and a synthesizing step for rendering a three-dimensional computer graphic image on the mock-up in an image obtained by the inputting step based on the position/orientation information and the three-dimensional CAD data and merging the real space image and the three-dimensional computer graphic image. Here, a three-dimensional position of the marker on the mock-up is a position with reference to a mark on the mock-up.

Further objects, features and advantages of the present invention will become apparent from the following description of the preferred embodiments with reference to the attached drawings.

DESCRIPTION OF THE PREFERRED EMBODIMENTS

Preferred embodiments of the invention will be described below with reference to attached drawings.

In a mixed reality system according to this embodiment, which will be described below, three-dimensional CG (3D-CG) data resulting from conversion of three-dimensional CAD data is displayed over a simple prototype (simple mock-up) created by a rapid prototyping apparatus from the three-dimensional CAD data by using the same position and orientation information. Thus, visual evaluation and tactile evaluation can be implemented at the same time so that the three-dimensional CAD data can be evaluated in a more finished form. Furthermore, in processing for creating a simple prototype from three-dimensional data created by 3D-CAD, colors, forms and so on of a simple prototype may be processed for easy preparation for superimposing processing.

First Embodiment

A mixed reality system according to a first embodiment will be described below. The mixed reality system arranges a simple prototype (simple mock-up) created based on three-dimensional data created by 3D-CAD and color of the background for easy extraction of a part corresponding to the hand of an operator on 3D-CG data displayed over the simple prototype.

Figure 1:
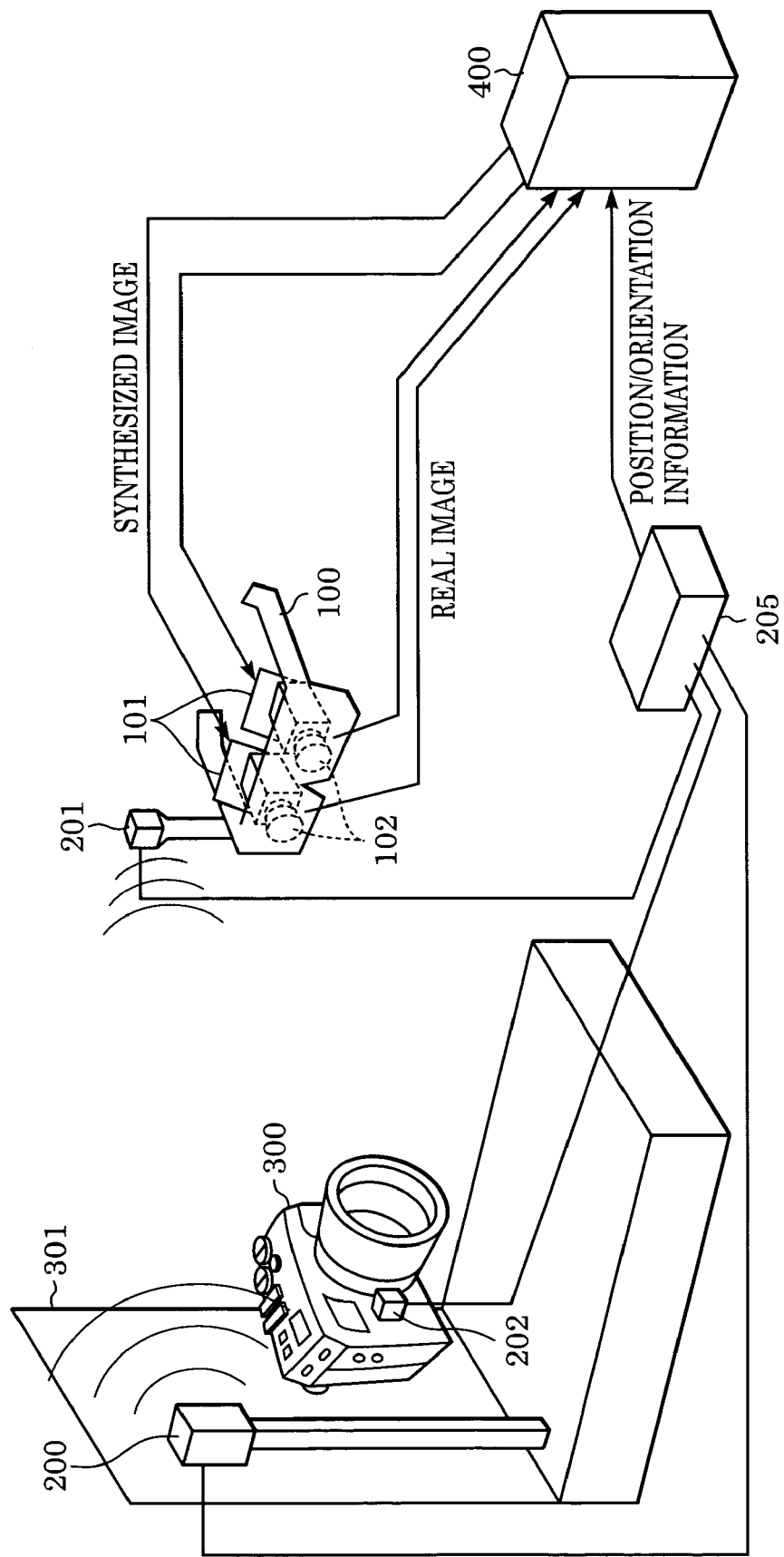
FIG. 1 is a diagram showing a schematic construction of a mixed reality system according to a first embodiment of the invention.

FIG. 1 shows a system construction according to the first embodiment.

FIG. 1 includes a head-mounted image input/output apparatus (head mounted-display abbreviated to HMD) 100 to be mounted at the head of an observer for observing an image resulting from synthesis of real space and virtual space images. FIG. 1 further includes a magnetic transmitter 200, magnetic sensors 201 and 202, a position/orientation measuring apparatus 205, a simple prototype (simple mock-up) 300, and a base 301. The magnetic transmitter 200 generates a magnetic field. The magnetic sensors 201 and 202 are used for measuring changes in a magnetic field generated by the magnetic transmitter 200. The position/orientation measuring apparatus 205 measures positions and orientations of the magnetic sensors 201 and 202 based on measurement results by the magnetic sensors 201 and 202. The magnetic sensor 201 is attached to the HMD 100 and is used for calculating a position of an observer's viewpoint and an observer's viewing direction. The simple prototype (simple mock-up) functions as an operation unit to be held and operated by the hand of an observer. Like the HMD 100, the magnetic sensor 202 is contained in the simple prototype 300. The position/orientation measuring apparatus 205 calculates a position and orientation of the simple prototype 300 based on a measurement result from the magnetic sensor 202. The base 301 is used for observing the simple prototype 300.

FIG. 1 further includes an image display apparatus 101, an image input apparatus 102 and an information processor 400. The image display apparatus 101 is contained in the HMD 100. A pair of the image input apparatus 102 for right and left eyes are contained in the HMD 100. The information processor 400 creates a CG image in accordance with position/orientation information calculated by the position/orientation measuring apparatus 205, places the CG image over an image input by the image input apparatus 102 of the HMD 100 and outputs the resulting synthesized image to the image display apparatus 101 of the HMD 100.

Figure 2:
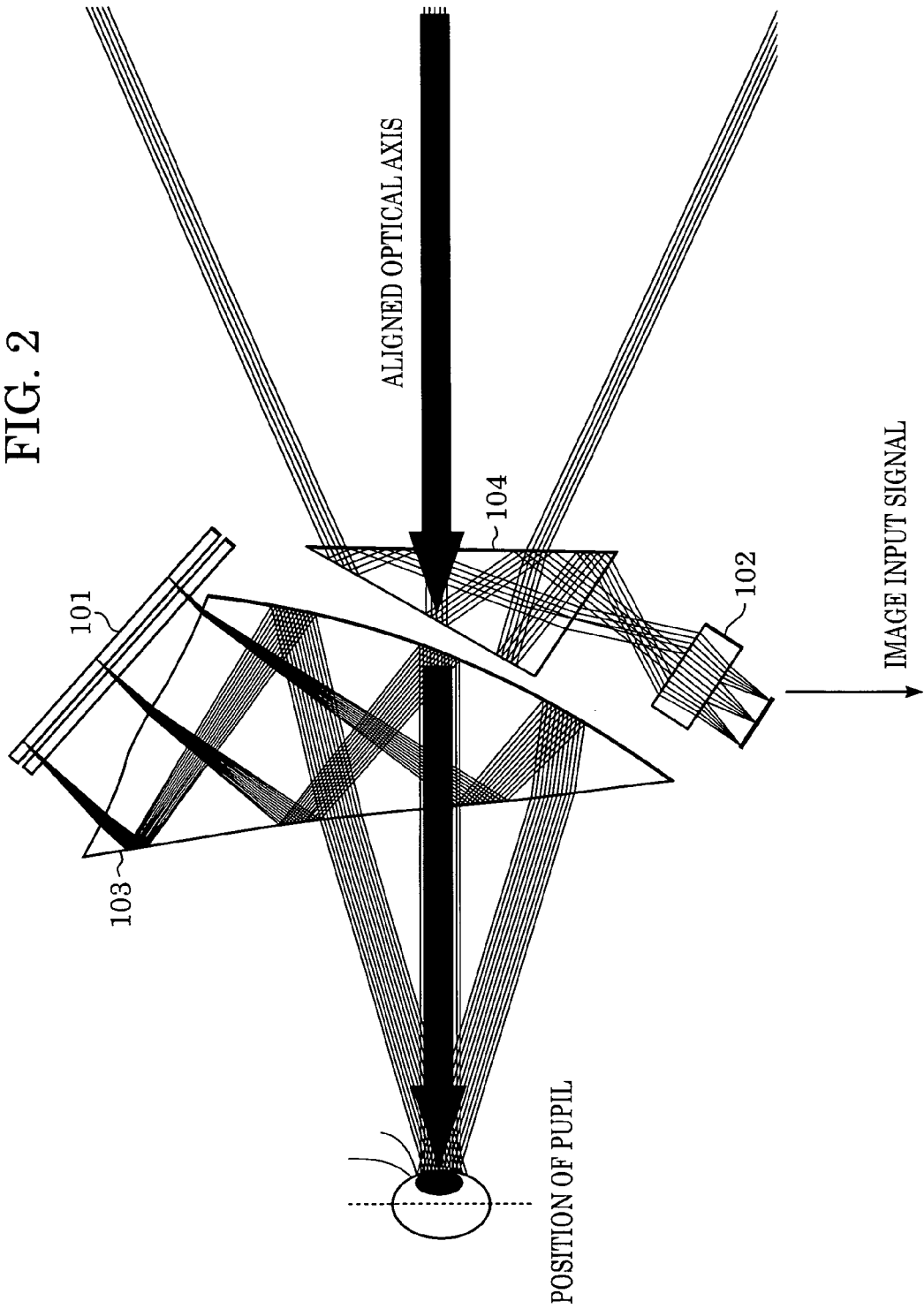
FIG. 2 is a diagram showing a construction of a head-mounted video image input/output device (HMD)

Next, a more specific construction of the HMD 100 will be described with reference to FIG. 2. FIG. 2 includes the image display apparatus 101 also shown in FIG. 1 and a free form surface prism (called FFS prism hereinafter) 103. The image display apparatus includes about 0.5 to a few inches small liquid crystal devices. The FFS prism 103 functions as a lens for magnifying an image on the image display apparatus 101. Under this construction, an image displayed on the image display apparatus 101 can be provided as a 90 inch image, for example, 2 m ahead of an observer.

FIG. 2 further includes the image input apparatus 102 also shown in FIG. 1 and an image-taking system prism 104. The image input apparatus 102 includes an image-taking device such as a CCD camera and a CMOS camera. The image-taking system prism 104 functions as a lens for converging light in a real space into the image input apparatus 102. The image-taking system prism 104 is disposed outside of the FFS prism 103 such that the optical axes of both of the prisms can agree. Thus, a parallax can be eliminated between an image input by the image input apparatus 102 and an image displayed on the image display apparatus 101, and an image of a real space can be reconstructed normally.

Figure 3:
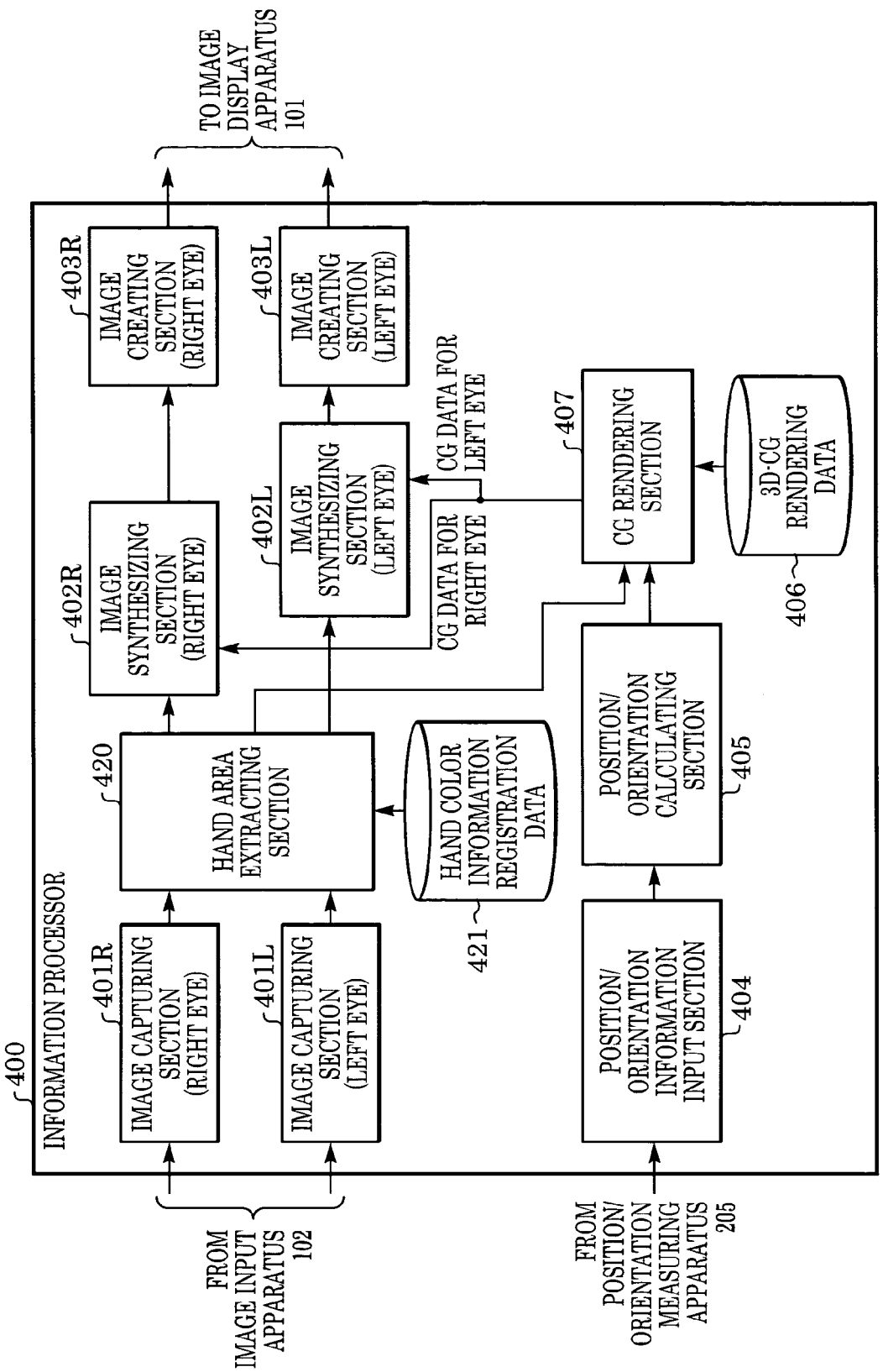
FIG. 3 is a block diagram showing a configuration of an information processor according to the first embodiment.

Next, a specific construction of the information processor 400 in FIG. 1 will be described with reference to FIG. 3.

The information processor 400 includes image capturing sections 401L and 401R, a position/orientation information input section 404, and a position and orientation calculating section 405. The image capturing sections 401L and 401R capture image data input from the image input apparatus 102 and provides digital signals of the image data into the information processor 400. The position/orientation information input section 404 captures position/orientation data of the HMD 100 and simple prototype 300 from the position/orientation measuring apparatus 205 into the information processor 400. The position/orientation calculating section 405 calculates a relative position relationship between the HMD 100 and the simple prototype 300 based on data input from the position/orientation input section 404.

The information processor 400 further includes 3D-CG rendering data 406 to be placed over the simple prototype 300 and a CG rendering section 407. The CG rendering section 407 calculates a position, size, angle (perspective) and so on to be used for rendering CG data based on a relative position relationship between the HMD 100 and the simple prototype 300, which is calculated by the position/orientation calculating section 405. The CG rendering section 407 renders the 3D-CG rendering data 406 based on the calculation result.

The information processor 400 further includes image synthesizing sections 402L and 402R and image creating sections 403L and 403R. The image synthesizing section 402L and 402R place a CG image created by the CG rendering section 407 over image data of a real space, which is captured by the image capturing sections 401L and 401R. The image creating sections 403L and 403R convert a synthesized image to analog data and output the analog data to the image display apparatus 101.

The information processor 400 further includes a hand-area extracting section 420. The hand area extracting section 420 extracts a hand area from real space image data captured by the image capturing sections 401L and 401R based on hand-color information registration data 421 and creates a mask image. Now, an example processing of the hand-area extracting section 420 will be described in detail with reference to FIGS. 4A to 4D.

The image synthesizing section 402 creates a synthesized image by placing (writing) a virtual space image (CG image) over real space image data. In this case, since a CG image is written over a real object, which should be actually placed before the CG image, a contradiction in depth may arise between the CG image and the real object.

Figure 4A:
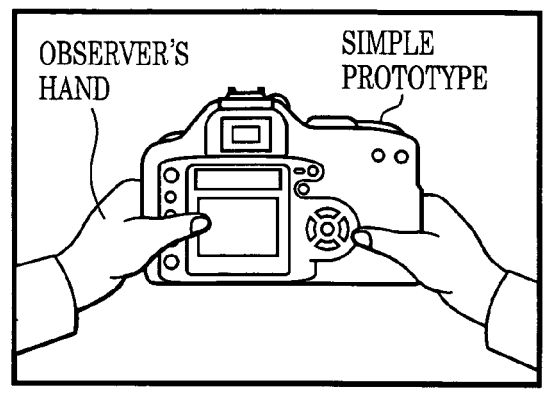
FIGS. 4A to 4D are diagrams each showing an example of a hand-area extracting processing according to the first embodiment.
Figure 4B:
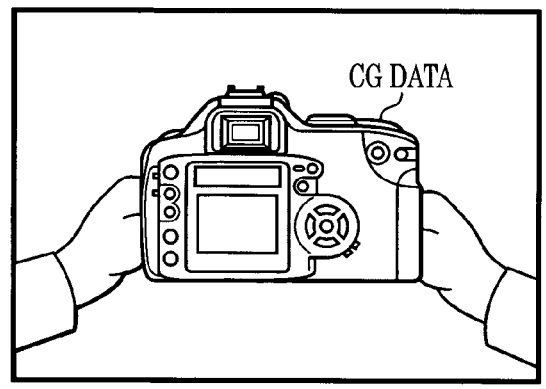
Figure 4C:
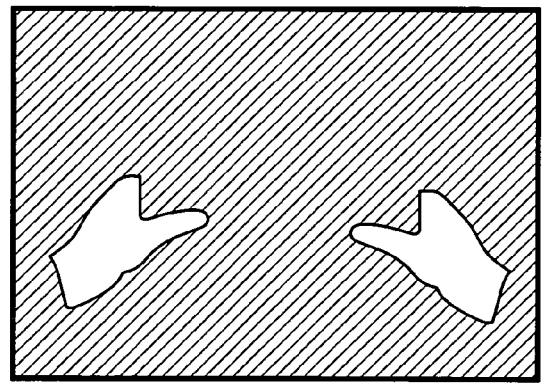

FIG. 4A shows an example of real space image data input by the image input apparatus 102 and is an image in which a simple prototype is held by observer's hand. A part of the hand (a thumb part) exists before the simple prototype. FIG. 4B is a synthesized image in which a CG image corresponding to the simple prototype is placed over the image in FIG. 4A. In other words, a part of the hand, which should be before the simple prototype, is hidden by the CG image, and a contradiction arises in depth. Thus, an observer may feel something is wrong in the image.

The mixed reality system according to the first embodiment can overcome a contradiction in depth as described above through image processing using real space image data held in the information processor 400. In other words, a hand area is only extracted by performing image processing from image data (FIG. 4A) input from the image input apparatus 102. A mask image (FIG. 4C) is created from the extracted hand area, and a CG image is created for a non-hand area specified in the mask area. The CG image is placed over the real space image. Thus, the hand area can be displayed before the simple prototype, and the feeling that the something is wrong in depth can be eliminated.

According to this embodiment, when an operator holds the simple prototype 300 by hand, the simple prototype 300 is painted in a color, such as blue, whose hue is significantly different from a hue of the hand color such that a part corresponding to the hand can be extracted from real space image information with high reliability. The real space image information also includes real objects (such as the base 301 on which the simple prototype 300 is placed and a surrounding screen) of the background of the simple prototype 300 as well as the observer's hand and the simple prototype 300. According to this embodiment, in order to extract the part corresponding to the hand from real space image information with high reliability, real objects of the background of the simple prototype 300 are colored in a color, whose hue is significantly different from the hue of the hand color. For example, the real objects may be painted in green, or a green cloth or paper may be pasted thereon.

Furthermore, when the simple prototype 300 and real objects in the background have a substantially same color (such as blue), the hand-color information registration data 421 can be created more easily. In this case, the hand-color information registration data 421 is used for extracting a part corresponding to the observer's hand from real space image information input as digital data. In other words, when the simple prototype 300 and the background have different colors, a hand-color area to be extracted must be registered in consideration of color areas in a color space. On the other hand, when the simple prototype 300 and the background have a substantially same color, a hand-color area to be extracted may be registered only in consideration of the area with the color in the color space. This point will be further described below. Since a color is registered by specifying an area in a color space, a hand-color area to be extracted slightly depends on a background color. In other words, a hand-color area to be extracted can be roughly defined when a background color and the hand color have significantly different hues. On the other hand, a hand-color area to be extracted must be more precisely defined when a background color and the hand color have close hues. Otherwise, the background color (or a part thereof) may be extracted as the hand color. Therefore, a hand-color area to be extracted must be defined more precisely when the background and a simple prototype do not have a substantially same color than the case that the background and the simple prototype have a substantially same color.

When a simple prototype and the background have a substantially same color (such as blue), a borderline (outline) between the simple prototype and real objects of the background becomes visually unclear. Thus, even when CG data is slightly displaced with respect to the simple prototype, the displacement is visually not clear.

Figure 5:
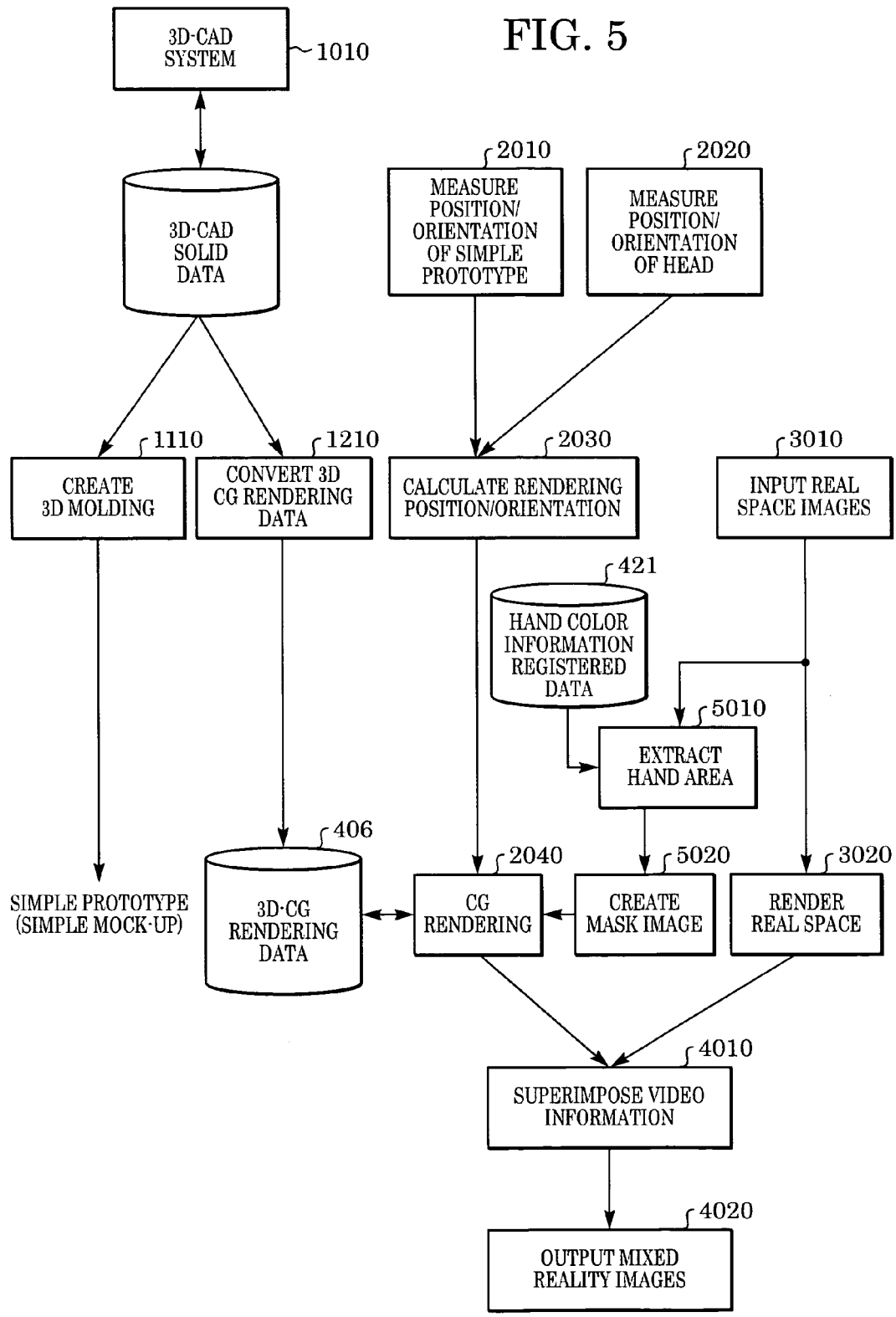
FIG. 5 is a diagram showing a processing flow according to the first embodiment.

A processing flow in the information processor 400 with the above-described construction according to this embodiment will be described with reference to FIG. 5. First of all, steps of creating the simple prototype 300 and the 3D-CG rendering data 406 from 3D-CAD data will be described with reference to processing steps on the left hand side of FIG. 5.

In order to design a form or create a design by using a general 3D-CAD system (step 1010), design data is generally stored as solid data inherent to a used 3D-CAD system. The simple prototype 300 is created from the solid data by using a rapid prototyping apparatus, for example (step 1110). On the other hand, 3D solid data is expressed by a set of geometrical parameters for design parts and cannot be rendered in CG as it is. Accordingly, the 3D solid data is converted to a data format (such as VRML) suitable for rendering 3D-CG (step 1210). In the mixed reality system according to this embodiment, virtual space is created by using 3D-CG rendering data 406 resulting from the conversion.

Next, processing steps of the mixed reality system according to this embodiment will be described with reference to processing steps of the right hand side of FIG. 5.

First of all, an initial position and orientation of the simple prototype 300 is measured at steps (not shown) before a step 2010. For example, the simple prototype 300 is fixed at a predetermined position and in a predetermined orientation, and measurement values of a position and orientation of the magnetic sensor 202 at that time are read. Then, differences between the measurement values and predetermined values are handled as the "sensor attached position and orientation". The position/orientation measuring apparatus 205 uses data and initial positions and orientations of the magnetic transmitter 200 and magnetic sensor 202 to measure the real space position and orientation of the simple prototype 300 (step 2010). Similarly, the position/orientation measuring apparatus 205 uses data of the magnetic transmitter 200 and magnetic sensor 201 to measure the position and orientation of the HMD 100 mounted on an observer in the real space (step 2020). The measurement data provided by the position/orientation measuring apparatus 205 is captured into the information processor 400 through the position/orientation information input apparatus 404. Then, the position/orientation calculating section 405 calculates a relative position/orientation relationship between the HMD 100 and the simple prototype 300 (step 2030).

On the other hand, in parallel with the steps 2010, 2020 and 2030, the real space images are captured from the image input apparatus 101 of the HMD apparatus 100 into the information processor 400 through the image capturing section 400 (step 3010).

At a step 3010, the image capturing section 401 of the information processor 400 captures real space image data. Then, the hand-area extracting section 420 compares color information of a pixel with color information of the hand area, which has been registered with the hand-color information registration data 421 in advance. If the color information of the pixel agrees with the color information of the hand area, the pixel color is judged as a color of a human hand. Therefore, the pixel is judged as a hand area (step 5010). Then, the judgement for the belonging to the hand area is performed on all pixels. Pixels judged as belonging to the hand area are only extracted, and data of the hand area is only recorded in a memory such as a video buffer. Thus, a mask image is created (step 5020).

The CG rendering section 407 renders a CG by using the relative position relationship calculated at the step 2030 and the 3D-CG rendering data 406 and archives the CG in a memory (not shown) such as a video buffer (step 2040). In this case, as described above, the CG rendering section 407 does not render CG images over the hand area in the mask image.

Figure 4D:
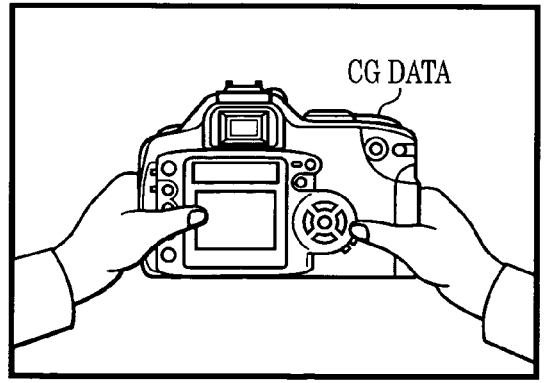

On the other hand, real space image data captured at the step 3010 is also archived in a memory such as a video buffer (step 3020). The image synthesizing sections 402L and 402R place the CG image created at the step 2040 over the image data archived at the step 3020 (step 4010). The synthesized image is converted to analog video signals, for example, by the image creating section 403 and is displayed on the image display apparatus 101 of the HMD 100 (step 4020). Since the synthesized image does not includes a CG image in the hand area part in the mask image, an image having natural depth as shown in FIG. 4D can be achieved.

The steps 2010 to 4020 are repeated during an image updating period in the image display apparatus 101 or during an updating period at the step 2040 of CG rendering so that information can be provided in real time. An example of a processing result according to this embodiment is as shown in FIGS. 4A to 4D.

While a magnetic apparatus is used as a unit for measuring a position and an orientation according to the first embodiment, the invention is not limited thereto. Apparently, another unit such as an optical position/orientation measuring apparatus can be used therefor.

As described above, according to the first embodiment, on a display having 3D-CG data created by three-dimensional data created by 3D-CAD over the simple prototype 300 created by the same three-dimensional data, a color of a predetermined area (such as a color of the hand area) to be extracted from the image is different from colors (such as complementary colors) of the simple prototype 300 and background objects. More preferably, colors of the simple prototype 300 and background objects may be substantially the same. Thus, the area extraction can be implemented more easily and securely. In other words, preparation (including registration of hand color information registration data) for placing 3D-CG data over the simple prototype 300 can be performed more easily.

Second Embodiment

According to the first embodiment, the position/orientation measurement is performed magnetically, for example. However, in the magnetic position/orientation measurement, some environments may cause instability in precision for measurement. When a metal object exists near a magnetic transmitter, for example, the magnetic field may become turbulent, which may cause a magnetic sensor to output unstable values. Furthermore, as the distance between the magnetic transmitter and the magnetic sensor increases, the measurement precision may decrease, which is a problem. The problem in measurement precision is caused not only in a magnetic sensor but also in various type of measuring apparatus.

Figure 6:
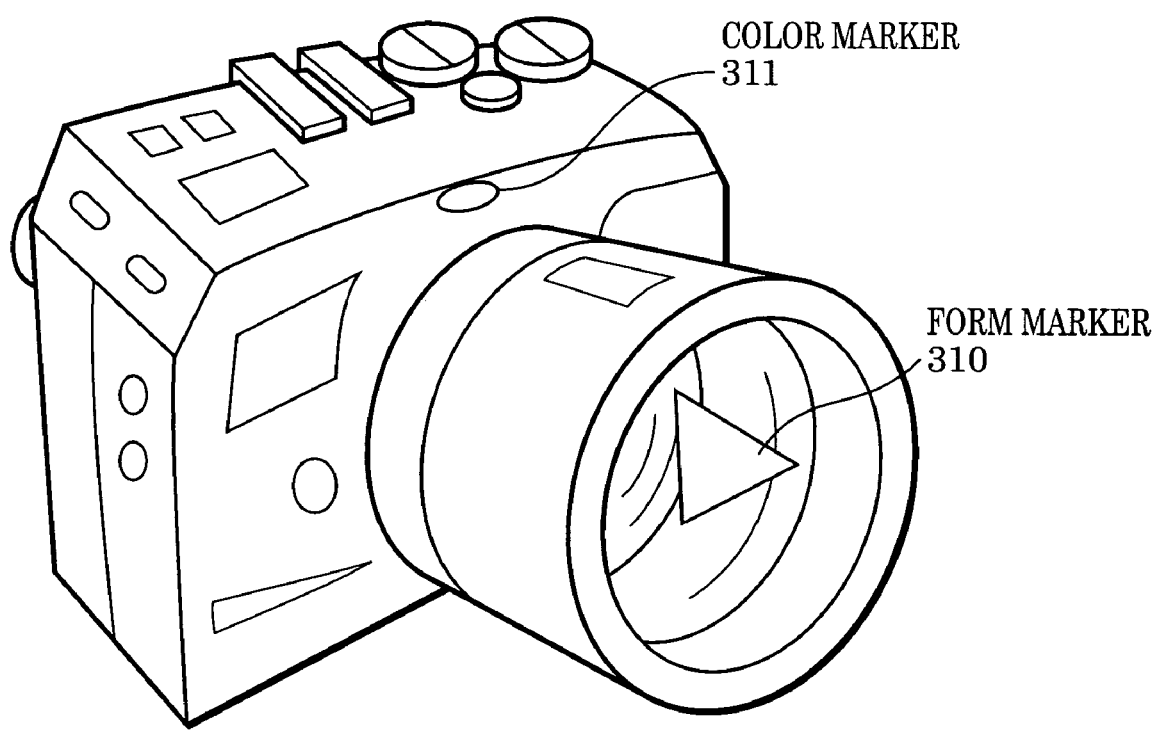
FIG. 6 is a diagram showing marker examples attached to a simple prototype.

Accordingly, a mixed reality system according to the second embodiment corrects a position and an orientation based on real space image data in an information processor 400 so as to improve the measurement precision. For example, as shown in FIG. 6, a marker for image recognition is attached to a simple prototype 300 and is used as a feature point. Various kinds of marker may be used such as a form marker 310 and a color marker 311 by a position/orientation correction algorithm. Furthermore, according to the second embodiment, a mark is given to the simple prototype 300 and is used as a reference for attaching a position/orientation correction marker. Thus, position information of the attached marker can be obtained easily.

Here, a method for correcting a position and an orientation by using a marker (called feature point hereinafter) will be described. Here, a method for correcting an external parameter for an image input section (camera) from one feature point will be described as a general correcting method. Here, a feature point may be a sticker-like marker placed over a simple prototype in a real space. In this case, the sticker-like marker has information on an artificially special color and form. Alternatively, a feature point may be a feature part in form of a simple prototype.

Figure 14:
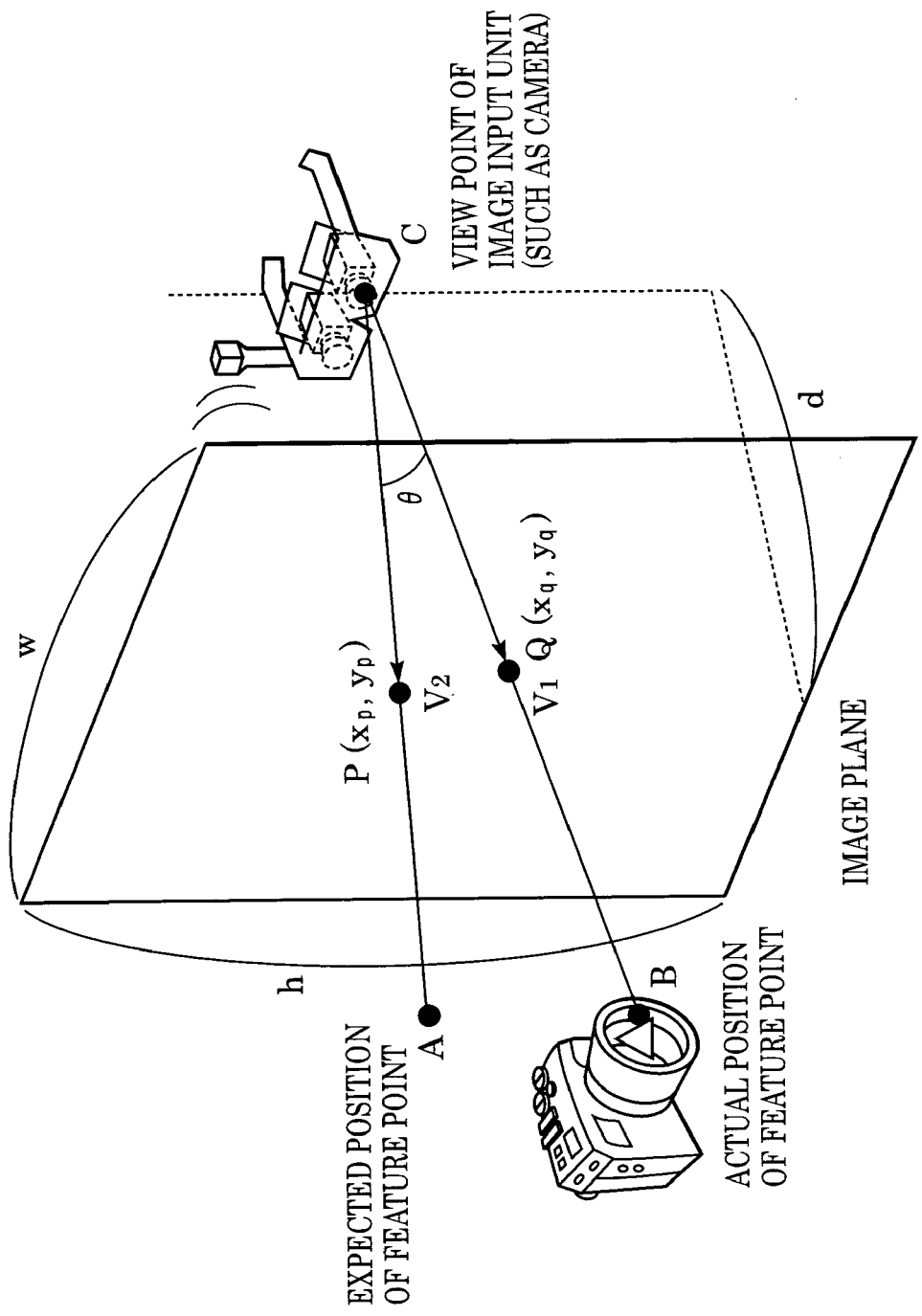
FIG. 14 is a diagram illustrating correction of position/orientation measurement with respect to feature points.

FIG. 14 shows a schematic diagram illustrating a general correcting method for external parameters (parameters representing a position and orientation) of an image input apparatus (camera). In FIG. 14, Point A refers to a position of a feature point expected based on positions and orientations of an image input apparatus (camera) and the simple prototype 300, Point B refers to an actual position of the feature point and Point C refers to a position of a viewpoint of the image input apparatus (camera). In this case, the positions indicated by Points A and B are positions in a camera coordinate system, and Point C is an origin of a coordinate system of the image input apparatus (camera). Point P refers to a position of Point A on an image plane, and Point Q refers to a position of Point B on an image plane. Here, as shown in FIG. 14, $(x_p, y_p)$ and $(x_q, y_q)$ are coordinates of Points P and Q, respectively, w and h are a width and height of an image plane, respectively, and d is a camera focal length (a distance from an image plane to the image input apparatus). Furthermore, $v_1$ is a vector from Point C to Point Q, $v_2$ is a vector from Point C to Point P, and $\theta$ is an angle between $v_1$ and $v_2$.

First of all, a method for changing an orientation by $\theta$ from the Point B direction to the Point A direction by using one feature point (that is, a correcting method by using a rotation of the image input apparatus) will be described.

By calculating $v_1$ and $v_2$ from these settings, the components can be expressed by:

[EQ 1]

$$v_1 = \left(x_q - \frac{w}{2}, y_q - \frac{h}{2}, -d\right) \quad (1)$$

$$v_2 = \left(x_p - \frac{w}{2}, y_p - \frac{h}{2}, -d\right)$$

Next, the vectors are normalized to a vector having a magnitude 1 by:

[EQ 2]

$$v_1' = \frac{v_1}{|v_1|} \quad (2)$$

$$v_2' = \frac{v_2}{|v_2|}$$

Here, when the image input apparatus (camera) is rotated, the rotational axis is orthogonal to a plane having the vectors $v_1$ and $v_2$ and is a straight line through a position (Point C) of a viewpoint of the camera. A direction vector of the rotational axis can be calculated from a cross product of the vectors $v_1$ and $v_2$ (in reality, normalized one $(v_1', v_2')$) by:

[EQ3]

$$v_x = v_1' \times v_2' \quad (3)$$

Here, $v_x$ is a direction vector of the rotational axis, and (l,m,n) refers to components thereof. A rotational angle θ is an angle formed by vectors $v_1$ and $v_2$ and can be calculated by:

[EQ4]

$$\theta = \arccos(v_1' \cdot v_2') \quad (4)$$

Therefore, a correction matrix $\Delta M_c$ to be used for a correction with a rotation of the image input apparatus can be calculated by:

[EQ 5]

$$\Delta M_c = \begin{bmatrix} ll(1-\cos\theta)+\cos\theta & ml(1-\cos\theta)+n\sin\theta & nl(1-\cos\theta)+m\sin\theta & 0 \\ lm(1-\cos\theta)+n\sin\theta & mm(1-\cos\theta)+\cos\theta & nm(1-\cos\theta)+l\sin\theta & 0 \\ ln(1-\cos\theta)+m\sin\theta & mn(1-\cos\theta)+l\sin\theta & nn(1-\cos\theta)+\cos\theta & 0 \\ 0 & 0 & 0 & 1 \end{bmatrix} \quad (5)$$

A position and orientation of the image input apparatus can be corrected by multiplying the correction matrix by a matrix expressing the position and orientation of the image input apparatus. In other words, Point P is displayed at the position of Point Q, and a marker position expected from position and orientation parameters on an image plane agrees with a real marker position. While a correcting method using a rotation of an image input apparatus (camera) has been described above, a method for correcting an error with a parallel movement of an image input apparatus can be used. The same effect can be obtained even with a correcting method using multiple feature points, but the description will be omitted herein.

Figure 7A:
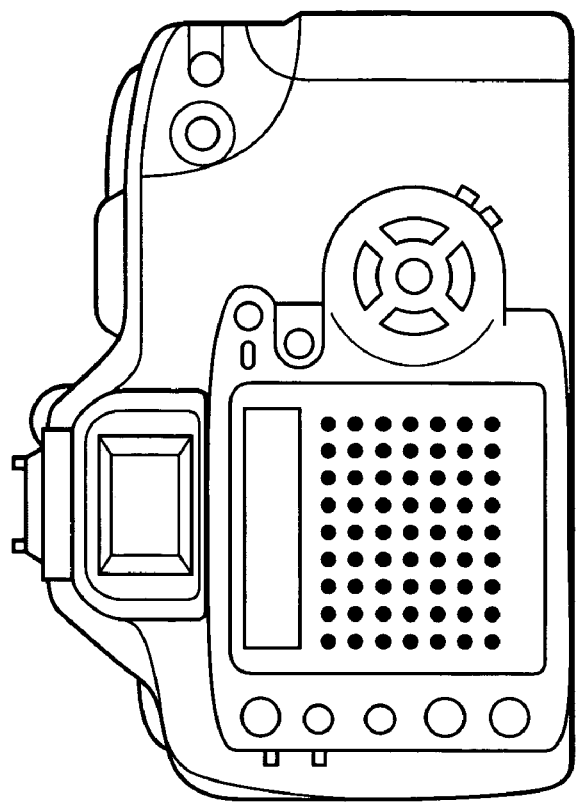
FIGS. 7A and 7B are diagrams each showing an example of a method for expressing a mark.
Figure 7B:
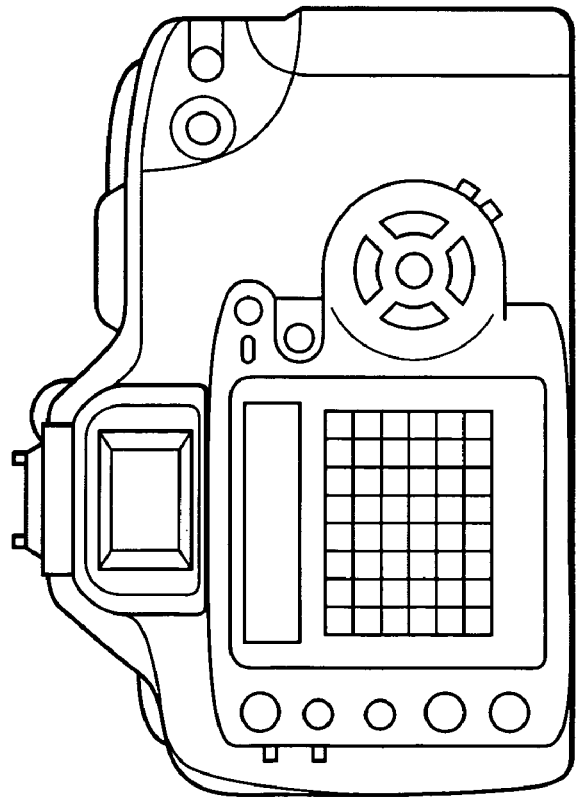

A mark for attaching a marker can be a group of intersecting straight lines (FIG. 7A) or a checker pattern including a group of points representing the intersections (FIG. 7B). An angle formed by crossing straight lines is not limited to 90 degrees but may be any degree such as 60 degrees. When a position for attaching a marker is predetermined precisely, a mark may be given to the point only.

A mark may be given by pattern rendering, pattern projection or projection-and-depression forming. When an object includes a mark pattern or form in advance, another mark is not required.

Position information of a given mark is measured by using a laser measuring instrument. Here, when marks are regularly aligned in a checker pattern on a plane as shown in FIGS. 7A and 7B, position information of marks at three points on one straight line only need to be measured. Thus, the position information of the entire marks can be calculated easily. For example, in FIG. 8, when position information of Marks A, B and C are $X_A=(x_A, y_A, z_A)$, $X_B=(x_B, y_B, z_B)$ and $X_C=(x_C, y_C, z_C)$, the position information of Mark D can be calculated by:

$$X_D = X_A + 3x(X_B - X_A) + 4x(X_C - X_A) \quad [A]$$

As described above, a mark at a known position is given, and a marker is attached based on the mark. Thus, the correction described above with reference to FIG. 14 can be performed, and advantages below can be provided:

(1) Even when multiple markers are attached, "marks at three points only need to be measured". Thus, the number of times of measurement can be reduced; and (2) When a marker is re-pasted, the position of the marker can be calculated easily from a mark. Thus, the measurement does not have to be performed again (which is an advantage because measurement using a laser measuring instrument requires time and labor).

The terms, "position of the mark" and "position of the marker", refer to positions of a mark and markers in a coordinate system defined in the simple prototype 300.

Figure 9:
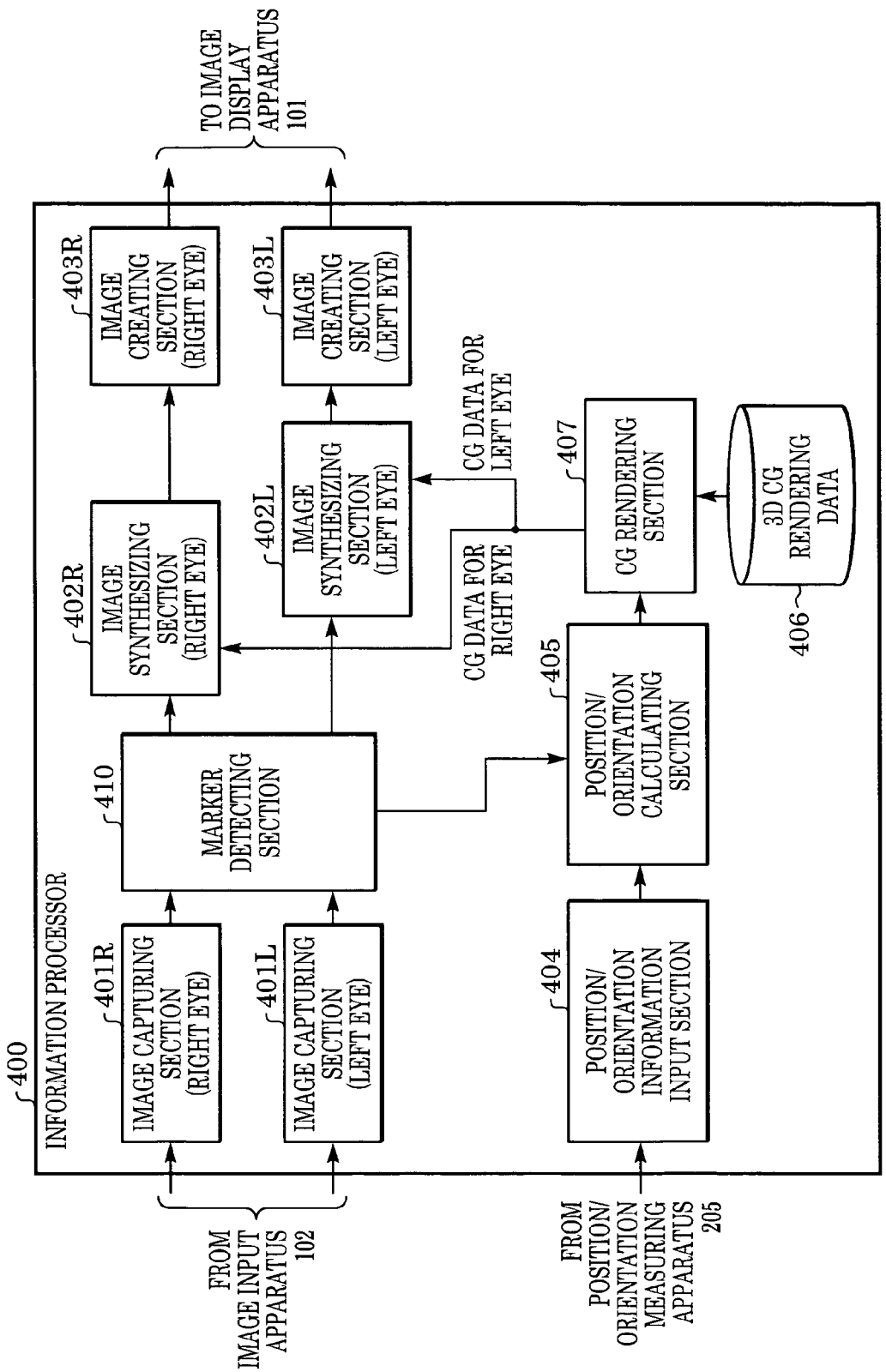
FIG. 9 is a block diagram showing a configuration of an information processor according to a second embodiment.
Figure 10:
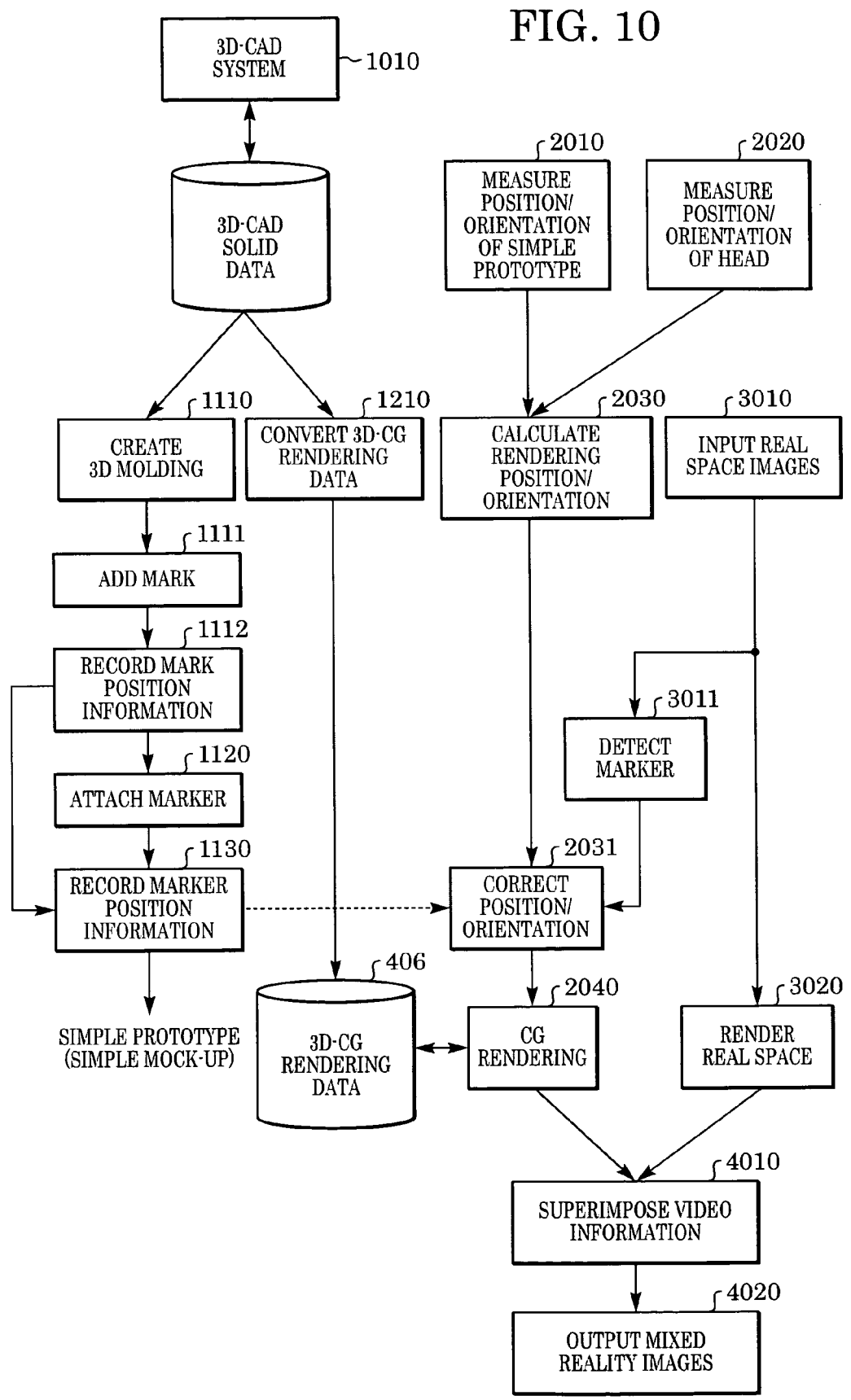
FIG. 10 is a diagram showing a processing flow according to the second embodiment.

Next, a construction and processing flow of the mixed reality system according to the second embodiment will be described with reference to FIGS. 9 and 10. The same reference numerals are given to the same components of the construction (FIG. 3) and processing (FIG. 5) according to the first embodiment, and the detail descriptions will be omitted here.

A marker detecting section 410 detects a marker shown in FIG. 6 from images input by the image capturing sections 401L and 401R and transmits the detection result (such as a position of the marker) to the position/orientation calculating section 405. The position/orientation calculating section 405 creates correction information based on the detection result from the marker detecting section 410 and the marker position detected based on position/orientation information input from the position/orientation information input section 404. The position and orientation of the simple prototype 300, which is calculated based on the position/orientation information input by the position/orientation information input section 404 is corrected and output by using the correction information.

Figure 8:
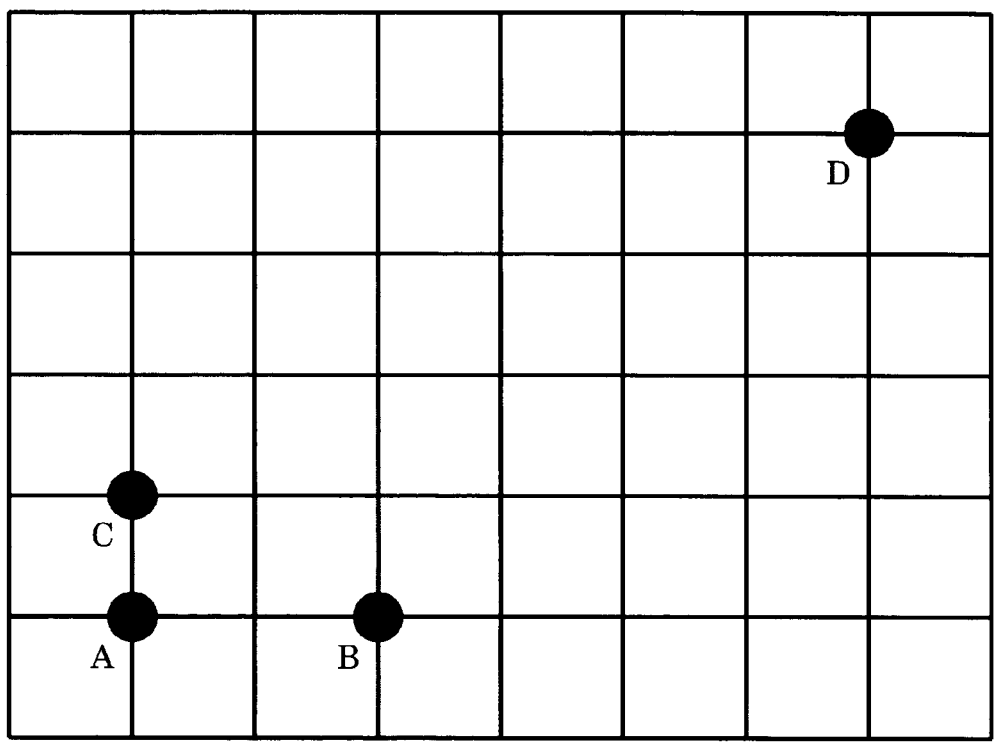
FIG. 8 is a diagram showing an example of a method for calculating position information of a mark.

A mark is given to the simple prototype 300 created by a rapid prototyping apparatus from 3D solid data (step 1111). Then, a position of the mark is measured by a laser measuring instrument, and the resulting mark position information is recorded (step 1112). Then, a marker is attached with reference to the given mark (step 1120). Furthermore, information on the position where the marker is attached is calculated with reference to mark position information and is recorded (step 1130). For example, markers are attached to positions of given marks as shown in FIG. 8, the marker positions can be calculated by [A] above.

In the processing of the mixed reality system, real space image data is captured into the information processor 400 at a step 3010. Then, the marker detecting section 410 extracts a position of a marker attached to the simple prototype 300 from the real space image data (step 3011). Correction information is calculated by using the marker position prestored at the step 1130 and the marker position extracted from the image data at the step 3011, and a measurement result output from the position/orientation measuring apparatus 205 and captured into the information processor 400 is corrected with the calculated correction information (step 2031). Then, CG rendering is performed by using the corrected data (2040).

While, according to this embodiment, a marker is attached with reference to a mark given to a simple prototype 300, the invention is not limited thereto. A marker may be attached with reference to a mark given to a real object (such as a base) in the background of the simple prototype 300. Marks may be given to both simple prototype and real object in the background.

As described above, according to the second embodiment, a mark is given to a simple prototype and is used as a reference for attaching a marker. Thus, position information of the attached marker can be obtained. In other words, preparation for processing of placing 3D-CG data over a simple prototype (registration of marker position information) can be performed easily.

Third Embodiment

Figure 11:
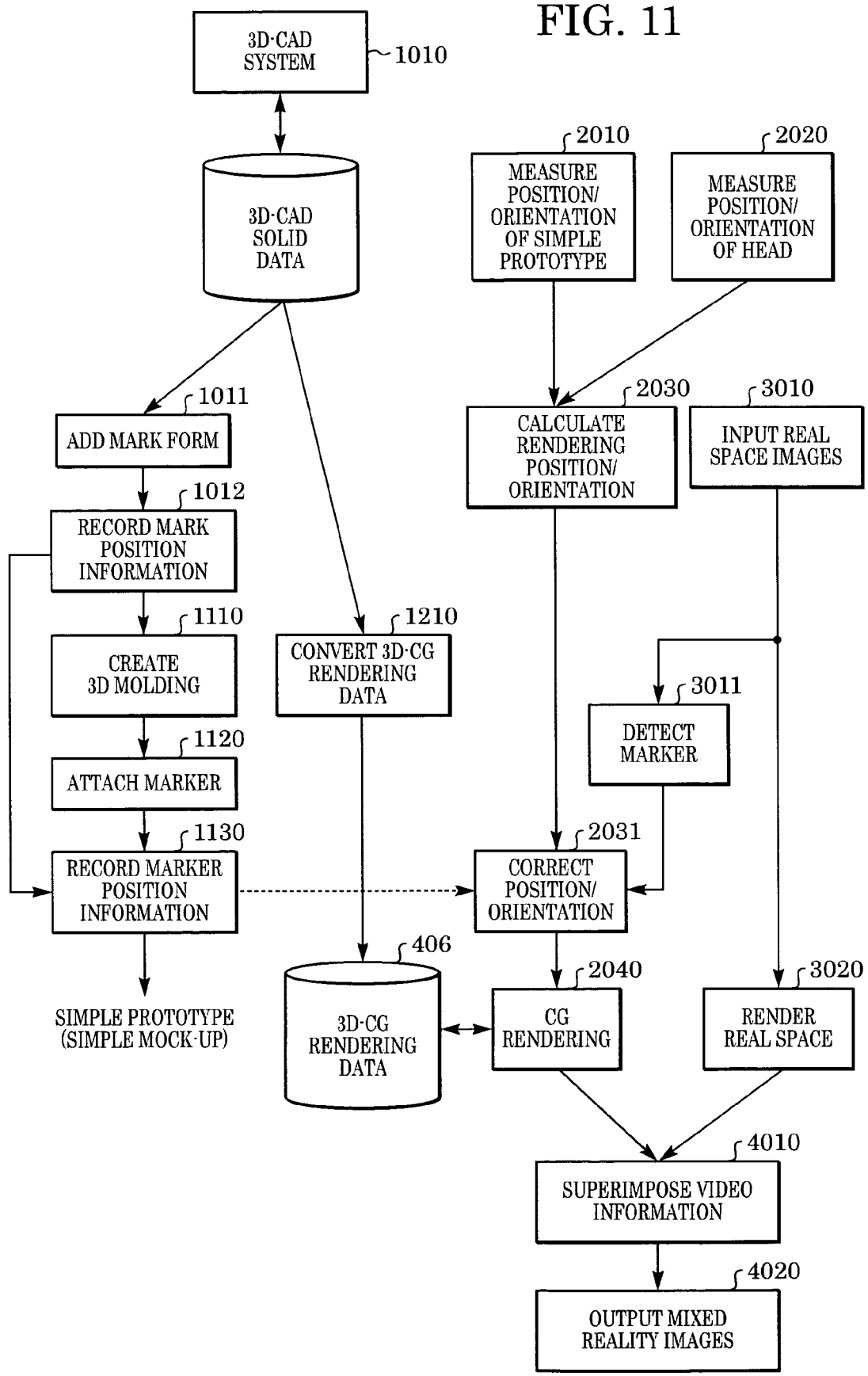
FIG. 11 is a diagram showing a processing flow according to a third embodiment.

According to a third embodiment, giving a marker to a simple prototype (simple mock-up) according to a second embodiment is achieved by giving mark form data to 3D-CAD data of a simple prototype. A processing flow according to the third embodiment will be described with reference to FIG. 11. The same reference numerals are given to the same steps as those of the processing (FIG. 10) according to the second embodiment. A construction of a mixed reality system according to the third embodiment is the same as the construction (FIG. 9) of the second embodiment.

First of all, a three-dimensional CAD system 1010 is used to give a mark form data to 3D-CAD solid data (step 1011) and record position information thereon (step 1012). In other words, a mark is given to 3D-CAD solid data as form data in the 3D-CAD solid data. Here, mark form data can include multiple intersecting channels or multiple small holes or projections indicating the intersections (see FIGS. 7A and 7B). In this case, the angle formed by intersecting channels is not limited to 90 degrees but may be any angle such as 60 degrees. Apparently, when a position to attach a marker is precisely determined, form data such as a small hole and projection may be given to the position only. Here, only by specifying a marker position, a mechanism for automatically giving pre-created form data to a predetermined position may be built in the 3D-CAD system 1010.

Next, at a step 1110 in 3D molding creating processing, a rapid prototyping apparatus for light molding, for example, creates a simple prototype 300 having a mark form. In other words, small channels or small holes or projections are given onto a surface of the simple prototype 300. For example, a simple prototype 300 having a mark as shown in FIG. 7A or 7B is created. With reference to the given mark form, a marker is attached to the simple prototype 300 (step 1120).

Position information on the marker attached to the simple prototype 300 is calculated based on position information on mark form data (which is recorded at the step 1012) given to the 3D-CAD solid data and is recorded (step 1130). The given "position information on form data" can be easily calculated in the 3D-CAD system 1010. Position information on a marker can be easily calculated from an absolute distance from a nearest mark form and/or distance ratios from multiple mark forms in the background, for example.

On the other hand, since a mark does not need to be given to 3D-CG rendering data, 3D-CAD solid data without mark form data is converted to a data format (such as VRML) suitable for rendering 3D-CG (step 1210). For example, a "not-rendered" flag is defined for form data to be not given to 3D-CG rendering data of 3D-CAD solid data. At a 3D-CG rendering data conversion step 1210, form data without the "not-rendered" flag is only converted to 3D-CG data.

The mixed reality system creates a virtual space by using 3D-CG rendering data 406 resulting from the conversion. The processing of the mixed reality system is the same as that of the second embodiment.

According to the third embodiment, a mark form data is given to 3D-CAD data of a simple prototype and is used as a reference for attaching a marker. However, the invention is not limited thereto. Mark form data may be given to 3D-CAD data of a real object (such as a base) in the background of a simple prototype and may be used as a reference for attaching a marker. Mark form data may be given to 3D-CAD data of both simple prototype and real object in the background.

While mark form data is given to 3D-CAD data according to the third embodiment, a mechanism for automatically giving predetermined form data only by specifying a mark position on 3D-CAD data may be built in the 3D-CAD system 1010. For example, in response to an instruction to give mark form data, a mark having a checker pattern as shown in FIG. 7A may be given at a lower left corner, which is predetermined as a desired position.

As described above, position information on an attached marker can be easily obtained according to the third embodiment by giving mark form data to 3D-CAD data of a simple prototype and using the mark form data as a reference for attaching the marker. In other words, preparation for processing of placing a simple prototype and 3D-CG data one over another (registration of marker position information) can be performed easily.

Fourth Embodiment

A fourth embodiment is a mixed reality system in which a sensor embedding form is created in a simple prototype (simple mock-up) by specifying a sensor embedded position in 3D-CAD data.

Figure 12:
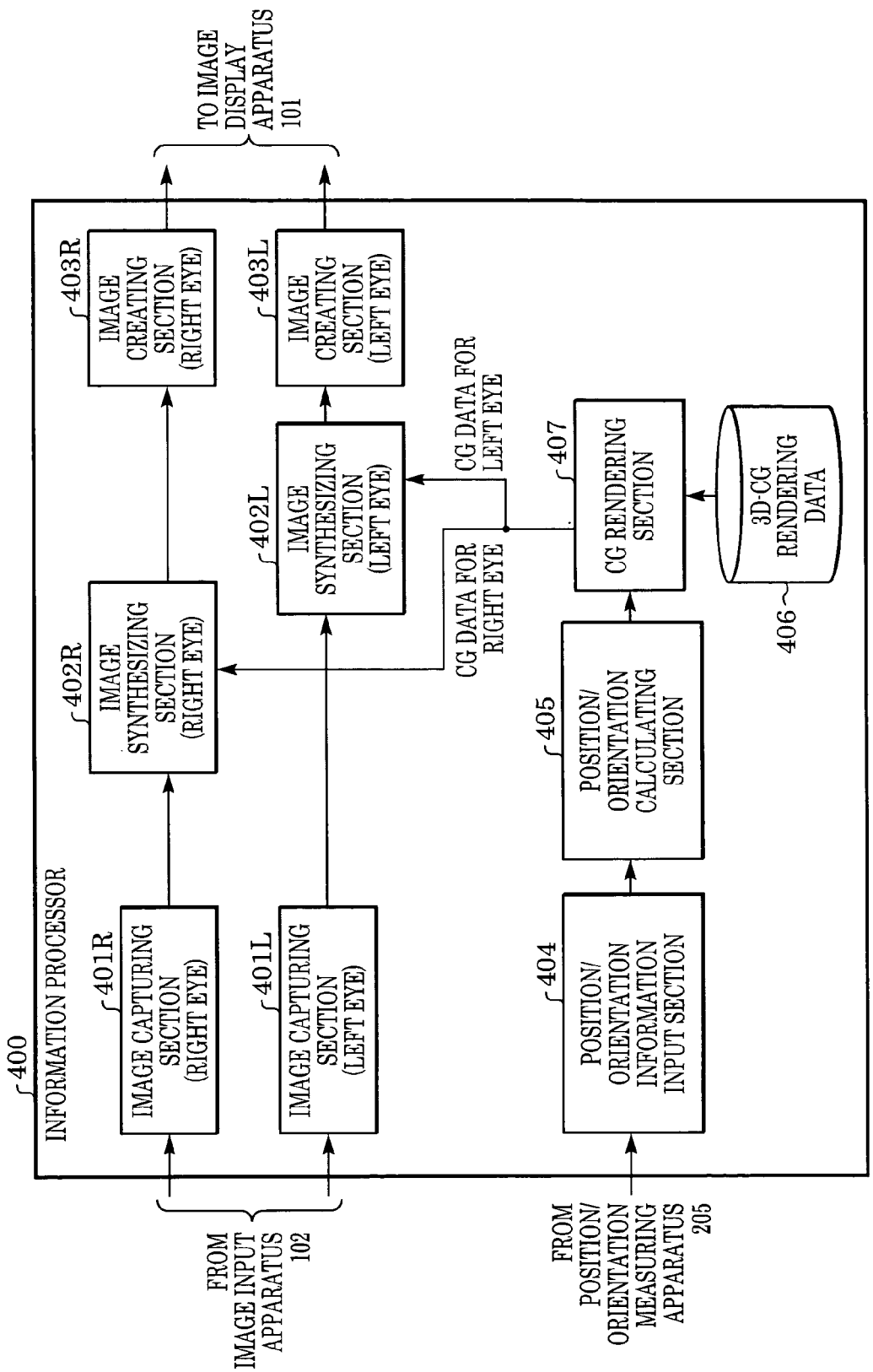
FIG. 12 is a block diagram showing a configuration of an information processor according to a fourth embodiment.

FIG. 12 shows a specific construction of an information processor 400 according to the fourth embodiment. The construction of the information processor 400 according to the fourth embodiment is the same as that of the first embodiment (FIG. 3). However, since a hand area is not extracted according to this embodiment components (which are the hand-area extracting section 420 and the hand-color information registration data 421) relating to the hand area extraction are omitted here. Apparently, the hand-area extraction as in the first embodiment and/or the marker extraction as in the second embodiment may be performed.

Figure 13:
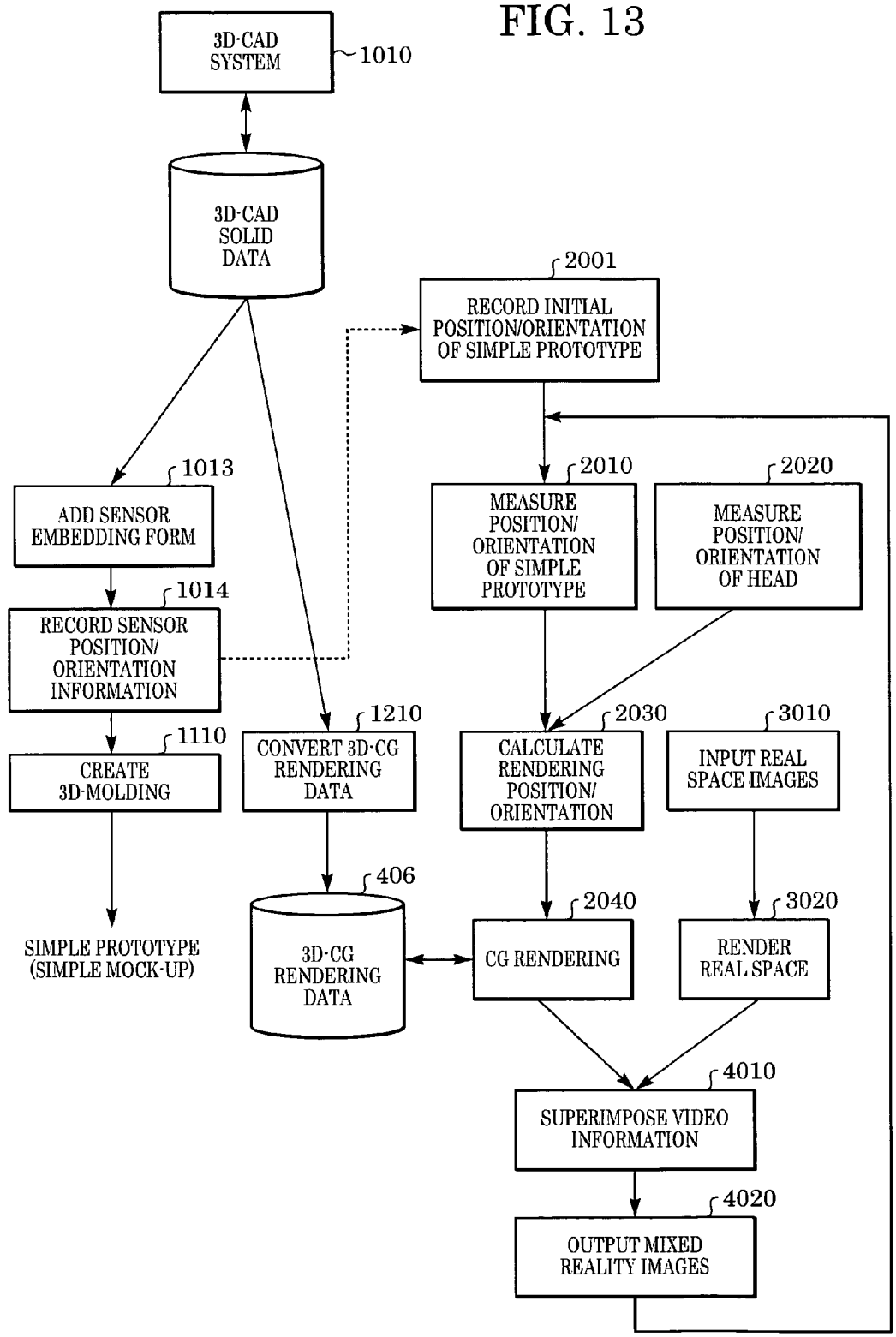
FIG. 13 is a diagram showing a processing flow according to the fourth embodiment.

Next, a processing flow according to the fourth embodiment will be described with reference to FIG. 13. The same reference numerals are given to the same steps as those in the processing (FIG. 5) according to the first embodiment.

First of all, a three-dimensional CAD system 1010 is used to specify a sensor embedded position and orientation in 3D-CAD solid data. As a sensor embedded position, a center position of a sensor may be specified, for example. In other words, a sensor embedding form data is given to 3D-CAD solid data (step 1013), and position information and orientation information thereof are recorded (step 1014). Thus, sensor embedding form data is given into 3D-CAD solid data. For example, a mechanism for automatically giving pre-created sensor embedding form data at a defined position and in a defined orientation may be built in the 3D-CAD system 1010. Then, a rapid prototyping apparatus, for example, creates a simple prototype 300 with a sensor embedding form (step 1110).

On the other hand, since a sensor embedding form does not need to be given to 3D-CG rendering data, 3D-CAD solid data without sensor embedding form data is converted to a data format (such as VRML) suitable for rending 3D-CG at the 3D-CG rendering data conversion step 1210. Thus, 3D-CG rendering data 406 without the sensor embedding form is created by, for example, defining a "not-rendered" flag for sensor embedding form of 3D-CAD solid data and preventing conversion of data with the "not-rendered" flag at the 3D-CG rendering data conversion step 1210.

The mixed reality system creates a virtual space by using 3D-CG rendering data 406 resulting from the conversion. In other words, the sensor position information recorded at the step 1014 is used to record an initial position and orientation of the simple prototype 300 (step 2001). Then, the recorded initial position and orientation and data on the transmitter 200 and sensor 202 are used to measure a position and orientation of the simple prototype 300 in a real space (step 2010). According to the first to third embodiment, the initial position and orientation of the simple prototype 300 are measured at steps (not shown) before the step 2010. For example, the simple prototype 300 may be fixed at a predetermined position and in a predetermined orientation, and position and orientation measurement values of the sensor at that time are read. Differences between the measurement values and predetermined values are handled as "position and orientation of the sensor mounted".

As described above, according to the fourth embodiment, a sensor embedding form can be created in a simple prototype easily by specifying the sensor embedding form onto 3D-CAD data. In other words, preparation for processing of placing a simple prototype and 3D-CG data one over another (creation of sensor embedding form) can be performed easily since a sensor embedding form can be created more easily than creating a simple prototype and then creating a sensor embedding form.

As described above, according to the embodiments above, preparation can be performed easily for using a mixed reality system to perform processing of placing, by using the same positions and orientation information, 3D-CG data created by converting 3D-CAD data over a simple prototype (simple mock-up) produced in a rapid prototyping apparatus from the same 3D-CAD data.

The object of the invention can be apparently achieved even by supplying a storage medium storing program code of software for implementing the functions according to the above-described embodiments to a system or an apparatus and reading and executing the program code stored in the storage medium by a computer (or a CPU or an MPU) in the system or apparatus.

In this case, the program code read from the storage medium implements the functions according to the above-described embodiments, and the invention includes a storage medium storing the program code.

A storage medium for supplying program code may be a flexible disk, a hard disk, an optical disk, a magneto-optical disk, a CD-ROM, a CD-R, a magnetic tape, a non-volatile memory card or a ROM.

Apparently, according to the invention, a computer executes read program code so that the functions of the above-described embodiments can be implemented. Furthermore, according to the invention, an operating system (OS), for example, operating on a computer may perform a part or all of actual processing based on an instruction from the program code so that the processing can implement the functions according to the above-described embodiments.

Furthermore, according to the invention, after program code read from a storage medium is written in a memory in a function extension board in a computer or in a function extension unit connecting to a computer, a CPU, for example, in the function extension board or function extension unit may perform a part or all of actual processing based on instructions from the program code so that the processing can implement the functions according to the above-described embodiments.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image display method for providing an observer with a synthesized image generated by merging a virtual space image and an image of a real space at a given viewpoint, the method comprising:

a) an inputting step of inputting a real space image captured by an image-taking device, the real space image including a mock-up made based on three-dimensional CAD data;

b) a measuring step of measuring positions and orientations of the image-taking device and the mock-up and obtaining position/orientation information representing the position and orientation of the mock-up in the real space image;

c) an area extracting step of extracting an area including a predetermined color from the real space image, the predetermined color is different from a color of the mock-up; and d) a synthesizing step of merging the real space image and a three-dimensional computer graphic image by superimposing the three-dimensional computer graphic image on the mock-up, except for the area including the predetermined color extracted in the area extracting step, the area extracted in the area extracting step is displayed before the three-dimensional computer graphic image, in the real space image based on the position/orientation information and the three-dimensional CAD data.

2. An image display method according to claim 1, wherein the color of the mock-up is a complementary color of the predetermined color of the area to be extracted in the area extracting step.

3. An image display method according to claim 1, wherein the color of the mock-up is substantially the same as a color of a real object in the background to be included in the real space image.

4. An image display method according to claim 1, wherein the color of a real object in the background to be included in the real space image is different from the color of the mock-up.

5. An image display method according to claim 1, wherein the predetermined color is a color of human hand.

6. An image display system for providing an observer with a synthesized image generated by merging a virtual space image and an image of a real space at a given viewpoint, the system comprising:

a) an inputting unit for inputting real space image captured by an image-taking device, the real space image including a mock-up made based on three-dimensional CAD data;

b) a measuring unit for measuring positions and orientations of the image-taking device and the mock-up and obtaining position/orientation information representing the position and orientation of the mock-up in the real space image;

c) an area extracting unit for extracting an area including a predetermined color from the real space image, the predetermined color is different from a color of the mock-up; and d) a synthesizing unit for merging the real space image and a three-dimensional computer graphic image by superimposing the three-dimensional computer graphic image on the mock-up, except for the area including the predetermined color extracted by the area extracting unit, the area extracted by the area extracting unit is displayed before the three-dimensional computer graphic image, in the real space image based on the position/orientation information and the three-dimensional CAD data.

7. An image display system for providing an observer with a synthesized image generated by merging a virtual space image and an image of a real space at given position, the system comprising:

an image taking unit adapted to capture the image of the real space including a mock-up made based on three-dimensional CAD data;

a color storing unit adapted to store color information of a color different from a color of the mock-up;

a measuring unit adapted to measure a position and orientation of the mock-up and a position and orientation of the image taking unit;

a position calculation unit adapted to calculate a relative position relationship between the mock-up and the image taking unit based on the measured result by the measuring unit;

an extracting unit adapted to extract an area including the color information from the real space image;

a rendering unit adapted to render a computer graphic image on the mock-up, in the real space image without the area extracted by the extracting unit, the area extracted by the extracting unit is displayed before the computer graphic image, using the three-dimensional CAD data based on the relative position relationship; and an output unit adapted to output the image rendered by the rendering unit to the observer.

8. An image display system according to claim 7, wherein the output unit includes a head-mounted display.

9. An image display system according to claim 8, wherein the image taking unit is mounted on the head-mounted display.

10. An image display system according to claim 7, wherein the color of the mock-up is blue or green.

11. An image display system according to claim 7, wherein the color information is designated by specifying an area in a color space.

* * * * *